Dec. 10, 1935.  F. BISHOP  2,023,778
RAKE
Filed Aug. 12, 1933
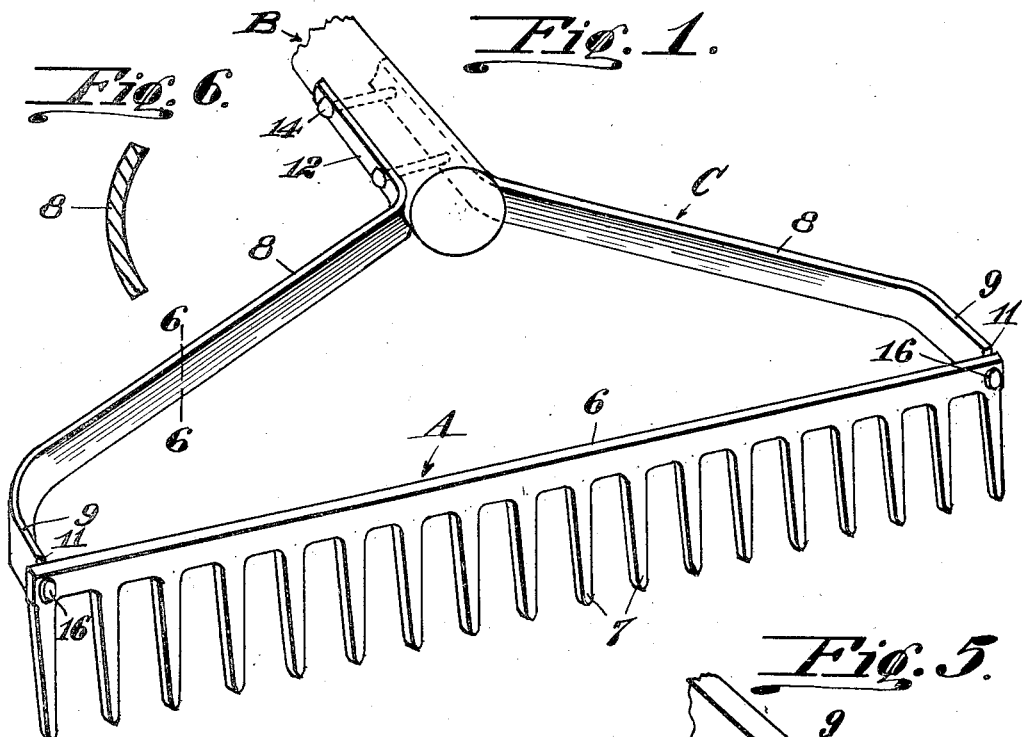
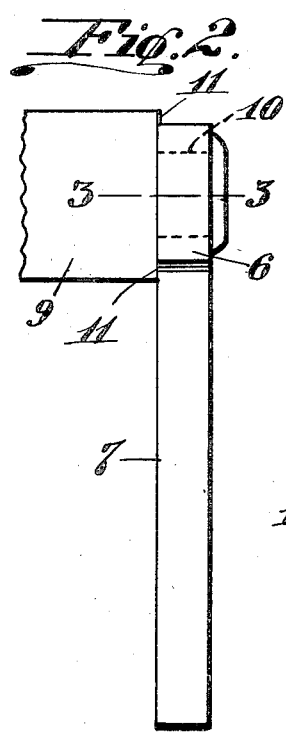
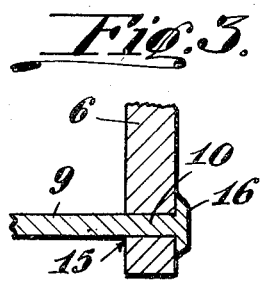
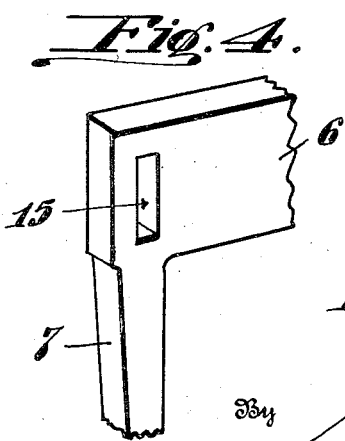
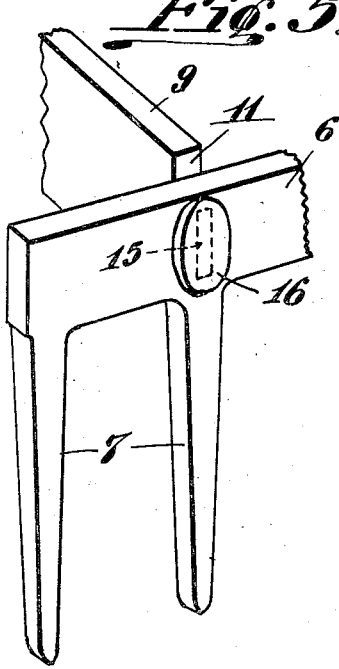
Inventor
Frank Bishop,
By R. S. Berry,
Attorney Patented Dec. 10, 1935

2,023,778

UNITED STATES PATENT OFFICE 2,023,778

RAKE

Frank Bishop, Los Angeles, Calif.

Application August 12, 1933, Serial No. 684,881

5 Claims. (Cl. 55—10)

This invention relates to a rake and more particularly pertains to the construction of lawn and garden rakes of the type which include a rake head, a handle and a bow connection between the rake head and the handle.

An object of the invention is to provide a construction in rakes of the above character which will greatly reduce the cost and simplify the construction of such rakes in comparison with the constructions heretofore employed.

It is now common practice to construct the bow type of lawn and garden rakes by attaching the rake head to the bows by means of a weld joint and one of the purposes of the present invention is to provide a construction which will obviate such weld joint and yet afford a stronger and more substantial connection between the rake head and the bow.

It is also common practice to construct the bows of rakes of the type above referred to of rods of circular cross section and the present invention is designed to afford a construction which will permit the ready employment of flat bars of soft steel which can be bent to shape and so formed as to possess greater strength than the rods of circular cross section generally used.

Another object is to provide a construction which will simplify the connection between the bow and the rake handle and do away with driving of bow ends into a hole in the end of the handle, and the use of ferrules as now commonly practiced, and which will afford a secure connection between the handle and the rake head which is easily applied and cannot be pulled off.

A further object is to provide a connection between the rake head and bow which will permit of such connection being effected at a point spaced inwardly from the ends of the rake head and in line with a tooth of the rake head where metal of the latter is of greater cross sectional area than at points between the teeth.

With the foregoing objects in view together with such other objects and advantages as may subsequently appear the invention resides in the parts and in the combination, construction and arrangement of parts hereinafter described and claimed and illustrated by way of example in the accompanying drawing in which:

Fig. 1 is a perspective view of the head portion of the rake showing the invention as applied;

Fig. 2 is an end view of the rake head showing the manner of attaching the bow thereto;

Fig. 3 is a detail in vertical section taken on the line 3—3 of Fig. 2;

Fig. 4 is a detail in perspective illustrating the manner of forming the rake head preparatory to attachment of the bow therewith;

Fig. 5 is a perspective view of a fragmentary end portion of the rake head showing a modified arrangement of the connection between the rake head and bow in which the bow is attached to the rake head in greater spaced relation to the end thereof than in the arrangement shown in Fig. 1;

Fig. 6 is a detail in cross section taken on the line 6—6 of Fig. 1 showing the manner of forming the bow of arched cross section to effect increased strengthening thereof.

Referring to the drawing more specifically A indicates generally the rake head, B designates the rake handle, and C denotes a bow affording a connection between the rake head and the handle.

The rake head A is preferably formed in the manner set forth in my copending application for Letters Patent Serial Number 645,557, filed Dec. 3, 1932, that is by punching the teeth of the rake head from a flat bar of soft steel. The rake head thus formed embodies a bar portion 6 constituting the back of the rake and from one margin of which projects the rake teeth 7; the teeth and back 6 being integral. The handle B comprises the ordinary wooden rake handle of circular cross section.

In forming the bow C a pair of flat bars 8 of soft steel of substantially rectangular cross section are employed, which bars are bent and worked while cold to impart thereto the requisite shape; the bars being pressed to form them of arcuate cross section as shown in Fig. 6 throughout a major portion of their length from one end thereof. One end portion 9 of each of the bars is maintained flat of elongated cross section and is punched out at its corners so as to provide a rectangular lug 10 protruding longitudinally therefrom; a pair of shoulders 11 being thus produced at the base of the lug. The flat end portion 9 of the pair of bars extend in parallel relation to each other and are bent at an angle to the portions of arched cross section so that the latter will extend obliquely relative to the flat end portions. The end portions of the bar opposite the flat end portions thereof are bent to form an extension 12 adapted to lie alongside the end portion of the handle B as shown in Fig. 1.

The pair of bars 8 employed to form the bow C are arranged with the end portions 12 thereof disposed on opposite sides of the handle B and are secured to the latter by pins 14 which are passed through openings in the portions 12 of the bars and extend through the handle B and have their ends headed to securely rivet the bow to the handle.

The rake head S is formed adjacent its ends, or at any suitable point intermediate its ends, with a pair of rectangular openings 15 which openings are preferably arranged in the back member 6 in alignment with a tooth 7, that is at a point in the length of the rake head where a maximum amount of metal is afforded. The openings 15 are elongated and extend transversely of the back member.

The lugs 10 on the outer ends of the bow are passed through the openings 15 as particularly shown in Figs. 2 and 3 with the shoulders 11 abutting against the back face of the rake head. The lugs 10 are of such length as to protrude beyond the outer face of the rake head which projecting portion is riveted to provide a head 16 which will co-operate with the shoulders 11 in effecting engagement between the bow and the rake head. The lugs 10 are of elongated rectangular cross section and conform to the walls of the openings 15 and are arranged with their elongated widths extending in the direction of the elongated widths of the bars 8 whereby the flat outer end portions of the bow members project at right angles from the rake head with the elongated dimensions of the bow member extending transversely of the back member of the rake head. By this arrangement the maximum resistance to bending strains on the end portions of the bow members and also of shearing of the lugs is attained by reason of the strains tending to bend the bows and to shear the lugs imposed thereon during operation of the rake being applied in the direction of the elongated widths of the bow members and lugs.

It will be noted that this connection between the bow and the rake head is spaced inwardly at the ends of the latter and obviously may be spaced at any suitable distance inwardly from the ends of the rake head as occasion may require and accordingly to the length of rake head desired. Fig. 6 shows the connection as arranged at the base of a second tooth from the end of the rake head. By this arrangement rake heads of various lengths may be mounted on bows of corresponding dimensions. In other words a 12 inch, 14 inch and 16 inch rake may be constructed with bows of corresponding sizes.

It has been found in practice that, at the cost of materials and labor prevailing at the time of execution hereof, the cost of forming and assembling the connection between the bow and the opposite ends of the rake head in the manner herein set forth is approximately one-fourth of a cent per rake, whereas the cost of the ordinary weld joint is approximately five cents per rake. Furthermore the joint afforded by the riveting of the lugs 9 is effected without heating the metal and results in a very strong construction.

By forming the bows of arched or arcuate cross section and of a flat width adjacent the connection with the rake head, such bows are not liable to be bent or broken under ordinary usage of the rake.

It will be noted that the bow will be formed with both a transverse and longitudinal arch at its point of juncture with the rake handle thus producing a shape highly resistant to bending under the strains to which the rake is subjected at this point, which with the strength afforded by the joint connecting the bow to the rake head produces a rake having greater strength and consequent durability and at a much less cost of manufacture than that of inferior rakes now on the market. Another economy effected in the manufacture of the rake resides in forming the lug 10 and shoulders 11 in the operating of cutting a long bar into the short lengths required in forming the bows, the cut off and formation of the shoulders and lug being effected in one operation.

I claim:

1. In a rake, a rake head having elongated rectangular openings extending laterally therethrough adjacent the ends thereof, a bow having lugs of rectangular cross section formed at the outer ends thereof with shoulders at the base of said lugs, said lugs being extended through said openings in the rake head and having their outer ends formed with heads; said rake head being engaged by said shoulders and heads.

2. In a rake, a rake head comprising a back member and a series of teeth projecting therefrom, said rake head being formed with elongated rectangular openings proximate the ends thereof, said openings being disposed in said back member in alignment with teeth projecting therefrom, a bow having flat reduced ends inserted through said openings and secured to said rake head.

3. In a rake, a rake head having a back member and a series of teeth thereon, said back member being formed proximate its ends with rectangular openings, and a bow having flat end portions of rectangular cross section punched out at the corners thereof to form end lugs of rectangular cross section; said lugs being extended through said openings and conforming thereto and having their outer ends headed to engage said rake head.

4. In a rake, a rake handle, a pair of bars of arcuate cross section having their inner ends disposed on opposed sides of said handle, rivets extending transversely through said handle and engaging said bars, said bars diverging outwardly from said handle and having their outer end portions bent to extend parallel to each other, said outer end portions being flat and formed with protruding lugs of rectangular cross section, and a rake head carried by said lugs.

5. In a rake, a rake-head having an elongated flat back member formed with an elongated rectangular opening adjacent each of its ends and extending transversely thereof, a pair of bow members having flat outer end portions of elongated rectangular cross section terminating in lugs of rectangular cross section, said lugs being elongated in the direction of the widths of the bow members and extending through and conforming to the walls of the openings in said rake-head back member whereby the flat outer end portions of the bow members project at right angles from the rake-head with the elongated dimension of the bow members extending transversely of the rake-head, shoulders on the ends of the bow members at the bases of said lugs abutting the inner side face of the rake head, and heads on said lugs overlying the outer face of said rake-head and co-operating with said shoulders to rigidly secure the outer ends of said bow members to said rake-head.

FRANK BISHOP.